United States Patent
Jahan

(10) Patent No.: US 11,068,535 B1
(45) Date of Patent: *Jul. 20, 2021

(54) SYSTEM AND METHOD FOR RECONSTRUCTING MUSIC CATALOGS

(71) Applicant: Symphonic Distribution Inc., Tampa, FL (US)

(72) Inventor: Eshan Shah Jahan, Brooklyn, NY (US)

(73) Assignee: Symphonic Distribution Inc., Tampa, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/183,733

(22) Filed: Feb. 24, 2021

Related U.S. Application Data

(63) Continuation of application No. 17/008,917, filed on Sep. 1, 2020, now Pat. No. 10,963,507.

(51) Int. Cl.
| | | |
|---|---|---|
| *G06F 17/00* | (2019.01) | |
| *G06F 16/61* | (2019.01) | |
| *G06F 16/955* | (2019.01) | |
| *G06F 16/68* | (2019.01) | |
| *G06F 16/65* | (2019.01) | |
| *G06F 16/683* | (2019.01) | |

(52) U.S. Cl.
CPC ............ *G06F 16/61* (2019.01); *G06F 16/65* (2019.01); *G06F 16/683* (2019.01); *G06F 16/686* (2019.01); *G06F 16/9558* (2019.01)

(58) Field of Classification Search
CPC ...... G06F 16/61; G06F 16/9558; G06F 16/65; G06F 16/683; G06F 16/686
See application file for complete search history.

(56) References Cited

U.S. PATENT DOCUMENTS

| | | | |
|---|---|---|---|
| 6,794,566 B2* | 9/2004 | Pachet | G06F 16/40 |
| | | | 84/600 |
| 6,973,451 B2* | 12/2005 | Laronne | G11B 27/11 |
| 8,346,789 B2* | 1/2013 | Klein, Jr. | G06F 16/48 |
| | | | 707/758 |
| 8,468,357 B2* | 6/2013 | Roberts | G06F 16/78 |
| | | | 713/176 |
| 8,495,075 B2* | 7/2013 | Miller | G06F 16/43 |
| | | | 707/758 |
| 8,634,947 B1 | 1/2014 | Kleinpeter et al. | |
| 9,280,577 B1 | 3/2016 | Hines | |
| 10,331,736 B2* | 6/2019 | Beckhardt | G06F 16/68 |
| 2003/0182315 A1* | 9/2003 | Plastina | H04N 21/4826 |
| 2006/0143236 A1* | 6/2006 | Wu | G11B 27/034 |
| 2007/0033229 A1* | 2/2007 | Fassett | G06F 16/68 |
| 2009/0112831 A1* | 4/2009 | Gupta | G06F 16/48 |
| 2011/0289094 A1* | 11/2011 | Fisher | G06F 16/41 |
| | | | 707/748 |

* cited by examiner

*Primary Examiner* — Joseph Saunders, Jr.
(74) *Attorney, Agent, or Firm* — Nicholas Pfeifer; Smith & Hopen, P. A.

(57) ABSTRACT

A system and method for automated reconstruction of previously released media content, without requiring detailed information from content owners. An embodiment of the system and method accesses content repositories of one or more digital service providers and retrieves metadata corresponding to the media content. Some embodiments include transforming the retrieved metadata to a standardized format. Audio fingerprinting can be used to match metadata to audio files and reconstruct the media content.

20 Claims, 12 Drawing Sheets

| DSP API Genre Responses (115) | Internal Distributor Genre (117) |
|---|---|
| UK Hip-Hop | UK Hip Hop |
| Trad Jazz | Traditional Jazz |
| Bop | Bebop |
| Cool Jazz | Cool |
| Environmental | Nature |
| Tribute | Pop |
| Cantopop/HK-Pop | Cantopop |
| High Classical | Classical Era |
| Exercise | Fitness & Workout |
| Contemporary | Contemporary Folk |
| Japanese Pop | J-Pop |
| Korean Classical | Korean Traditional |
| Rock y Alternativo | Alternativo & Rock Latino |
| Urbano latino | Latin Hip-Hop |
| Música Mexicana | Regional Mexicano |
| Música tropical | Salsa y Tropical |

Fig. 6

SYSTEM AND METHOD FOR RECONSTRUCTING MUSIC CATALOGS

CROSS-REFERENCE TO RELATED APPLICATIONS

This nonprovisional application is a continuation of and claims priority to nonprovisional application Ser. No. 17/008,917, entitled "A SYSTEM AND METHOD FOR MUSIC METADATA RECONSTRUCTION AND AUDIO FINGERPRINT MATCHING," filed Sep. 1, 2020 by the same inventor(s).

BACKGROUND OF THE INVENTION

1. Field of the Invention

This invention relates, generally, to audio metadata and audio files. More specifically, it relates to reconstruction of digital media content.

2. Brief Description of the Prior Art

In the music industry, content owners (such as an artist or label) create catalogs of music releases. The content owners hire distributors to distribute the catalogs to digital service providers (DSPs) such as download stores or streaming services. Each distributor has its own preferred types of data and data arrangement for its catalogs. Thus, a music catalog will likely have a different representation between distributors.

Moreover, each DSP has a preferred data format and the distributors are expected to transform their internal music catalogs into the DSP's preferred data format. As a result, many distributors employ specific algorithms to convert their media content (metadata and audio files) format to the different preferred formats of the various DSPs. Thus, when a new distributor takes over a music catalog, the new distributor first converts the media content to their own internal format and then applies algorithms to convert the catalogs into the DSP preferred formats. If the new distributor makes an error in creating or recreating the music catalog, it has significant negative downstream effects.

When in circulation, each song accumulates valuable consumer connections. For example, songs may receive positive ratings and reviews, or they may gain placements in music charts, playlists, or users' collections. They can be streamed by few consumers or many, skipped partway through or played repeatedly, all of which may be used as signals in the DSP's algorithmic recommendations, which drive much of music consumption. All of this information is a critical determinant of the music's earning potential. Collectively, this data will be referred to as the "DSP usage data."

When content owners of existing music catalogs decide to engage a new distributor, the music catalogs must be reconstructed with the new distributor and the previous distributor must be informed to cease distribution. Assuming the content owner has reliable records, the new distributor can attempt to use these records to perform a manual transformation of the media content into the new distributor's custom data formatting. This process is very inefficient and error prone. Furthermore, the content owner may not have the complete information, due to data being lost, stale, or incomplete (for example, if the distributor made changes that were not incorporated back into the content owner's records).

If the content is moved from one distributor to another (temporarily creating two instances of each recording until the previous distributor removes their instances), DSPs will typically attempt to transfer the DSP usage data to the new instances of the content, preserving the earning potential. However, this relies on a faithful reconstruction of the catalog, so any errors can derail the process, causing significant loss of revenue. As a result, many content owners are discouraged from switching distributors at all.

Furthermore, even if the metadata is properly represented in the new distributor's catalog, the content owner also needs to match each of their audio files to the correct piece of metadata. This process is also error prone as it often cannot be done visually and involves listening to each recording to verify that it is correctly linked.

Accordingly, what is needed is a system and method for automatically and correctly reconstructing previously released music content to ensure that DSP usage data follows the music content. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for method for automatically and correctly reconstructing previously released music content, without requiring detailed information from content owners, and automatically and correctly assigning each audio file to the corresponding metadata without user input and intervention is now met by a new, useful, and nonobvious invention.

The novel structure includes a system and method for automatically and correctly reconstructing previously released music content to ensure that DSP usage data follows the music content.

An embodiment of the present invention includes a method for reconstructing a digital audio catalog from non-standardized public representations, such as those available through a digital service provider or other sources of digital media content. The method includes receiving a plurality of unique identifiers with each unique identifier corresponds to audio content in the digital audio catalog. In an embodiment, each unique identifier includes a universal product code, an international standard recording code, or a direct hyperlink.

Once the unique identifiers are known, the present invention digitally accesses, over a computer network, a content repository, such as those provided by digital service providers. The content repository includes metadata corresponding to audio recordings. In an embodiment the content repository is accessed via an application programming interface.

The method further includes searching the accessed content repository for audio recordings that match one of the unique identifiers in the plurality of unique identifiers. Responsive to finding an audio recording that matches one of the unique identifiers in the content repository, the present invention retrieves from the content repository a non-standardized public representation of metadata for the audio recording that matches one of the unique identifiers. Then the present invention transforms the retrieved metadata values from the non-standardized public representations into a standardized format using mapping tables. In some embodiments, the present invention transforms the retrieved metadata values from their non-standardized public representations into a standardized format using format removal algorithms. Some embodiments use mapping tables to standardize certain metadata fields and format removal algorithms to standardize other metadata fields. Some embodiments use mapping tables and format removal algorithms to standardize the same metadata fields.

In an embodiment, a plurality of audio files corresponding to the audio content are received. A digital audio fingerprint is identified for each audio file. Each audio fingerprint includes distinctive metadata values for a corresponding audio file. In some embodiments, the distinctive metadata includes a universal product code, an international standard recording code, or a direct hyperlink.

The present invention then determines if the distinctive metadata values for any of the corresponding audio files match one of the identified metadata values in their standardized format. Responsive to determining a match between any of the corresponding audio files and one of the identified metadata values in their standardized format, the corresponding audio file is linked to the metadata values in their standardized format. As a result, each of the plurality of audio files can be matched and linked to the identified metadata values in their standardized format to digitally reconstruct the digital audio catalog in a standardized format.

Some embodiments, in response to a failure to match one of the unique identifiers to any audio recordings in the content repository, generate a notification of the failure and electronically transmitting the notification to an end user.

In some embodiments, the present invention digitally accesses, over a computer network, a content repository for a plurality of digital service providers. Responsive to finding audio recordings that match one of the unique identifiers in the content repository for more than one digital service provider, the present invention performs the following additional steps for each audio recording in each of the digital service providers' content repositories. The additional steps include retrieving non-standardized public representations of metadata for the audio recording that matches one of the unique identifiers; identifying and transforming metadata values from the non-standardized public representations into standardized formats. The transformation can be achieved by using a format removal algorithm and/or a mapping table corresponding to the digital service provider from which the metadata was retrieved. The present invention then determines if the identified metadata values for each digital service provider in their standardized formats match each other. Responsive to a determination that the identified metadata values for each digital service provider in their standardized formats do not match each other, a notification of inconsistent metadata is generated and electronically transmitted to an end user.

In some embodiments, the present invention also transforms the reconstructed digital audio catalog from the standardized format to a preferred format of a digital service provider. Then the digital audio catalog in the preferred format of the digital service provider is digitally transmitted to the digital service provider.

In some embodiments the present invention includes a method for reconstructing a digital audio catalog from non-standardized public representations available through a plurality of digital service providers. The method includes receiving a plurality of unique identifiers. Each unique identifier corresponds to audio content in the digital audio catalog.

The present invention digitally accesses, over a computer network, a plurality of digital service providers' content repositories via application programming interfaces. Each application programming interface provides access to a particular digital service provider's content repository. Each content repository includes metadata corresponding to the particular digital service provider's audio recordings.

For each of the unique identifiers, the present invention searches the plurality of digital service providers' content repositories for audio recordings that match the unique identifiers. Responsive to finding an audio recording that matches one of the unique identifiers in the plurality of digital service providers' content repositories, the present invention retrieves a non-standardized public representation of metadata for the audio recording that matches one of the unique identifiers; identifies and transforms metadata values from the non-standardized public representations of retrieved metadata using a mapping table and/or a format removal algorithm corresponding to the digital service provider from which the metadata was retrieved. Some embodiments include specific mapping tables and/or specific format removal algorithms for each metadata field and/or for each DSP.

Some embodiments include receiving a plurality of audio files corresponding to the audio content; identifying a digital audio fingerprint for each audio file, wherein each audio fingerprint includes distinctive metadata values for a corresponding audio file; determining if the distinctive metadata values for any of the corresponding audio files match one of the identified metadata values in their standardized formats; and responsive to determining a match between any of the corresponding audio files and one of the identified metadata values in their standardized formats, linking the corresponding audio file to the metadata values in their standardized formats. As a result, each of the plurality of audio files can be matched and linked to the identified metadata values in their standardized formats to digitally reproduce the digital audio catalog in a standardized format.

Some embodiments, responsive to a failure to find the audio recording that matches one of the unique identifiers in one of the digital service providers' content repositories, generates a notification of the failure and electronically transmit the notification to an end user. In some embodiments, the digital audio catalog is transformed from the standardized format to a preferred format of a digital service provider and digitally transmitted to the digital service provider in the preferred format of the digital service provider.

In some embodiments, responsive to finding audio recordings that match one of the unique identifiers in more than one of the digital service providers' content repositories, the present invention performs the following steps for each audio recording in each of the digital service providers' content repositories: retrieving non-standardized public representations of metadata for the audio recording that matches one of the unique identifiers; identifying and transforming metadata values from the non-standardized public representations of retrieved metadata using one or more format removal algorithms and/or one or more mapping tables corresponding to the digital service provider from which the metadata was retrieved; and responsive to a determination that the identified metadata values for each digital service provider in their standardized formats do not match each other, generating a notification of inconsistent metadata and electronically transmitting the notification to an end user.

Some embodiments include mapping tables and/or format removal algorithms corresponding to each digital service provider that is digitally accessed over the computer network. Some embodiments include specific mapping tables and/or specific format removal algorithms for each metadata field and/or for each DSP.

In some embodiments, each unique identifier includes a universal product code, an international standard recording code, or a direct hyperlink. In some embodiments, the distinctive metadata includes a universal product code, an international standard recording code, or a direct hyperlink.

An embodiment of the present invention includes a system for reconstructing a digital media catalog from non-standardized public representations available through a digital service provider. The system executes the steps described below.

The system receives a plurality of unique identifiers with each unique identifier corresponding to media content in the digital media catalog. The system then digitally accesses, over a computer network, a content repository of the digital service provider. The content repository includes metadata corresponding to media recordings.

The system searches the accessed content repository for media recordings that match one of the unique identifiers in the plurality of unique identifiers. Responsive to finding a media recording that matches one of the unique identifiers in the content repository, the system retrieves from the content repository a non-standardized public representation of metadata for the media recording that matches one of the unique identifiers. The system identifies and transforms metadata values from the non-standardized public representations of retrieved metadata into a standardized format using mapping table(s) and/or format removal algorithm(s). Some embodiments include specific mapping tables and/or specific format removal algorithms for each metadata field and/or for each DSP.

In some embodiments, the system retrieves or receives a plurality of media files corresponding to the media content. The system identifies a digital media fingerprint for each media file. Each media fingerprint includes distinctive metadata values for a corresponding media file;

The system determines if the distinctive metadata values for any of the corresponding media files match one of the identified metadata values in their standardized format. Responsive to determining a match between any of the corresponding media files and one of the identified metadata values in their standardized format, the corresponding media file is linked to the metadata values in their standardized format. As a result, each of the plurality of media files can be matched and linked to identified metadata values in their standardized format to digitally reconstruct the digital media catalog in a standardized format.

In some embodiments, the system transforms the reconstructed digital media catalog from the standardized format to a preferred format of a digital service provider and digitally transmits the digital media catalog in the preferred format to the digital service provider.

In some embodiments, the system, responsive to a failure to match one of the unique identifiers to any media recordings in the content repository, generates a notification of the failure and electronically transmitting the notification to an end user.

In some embodiments, the system digitally accesses, over a computer network, a content repository for a plurality of digital service providers. Responsive to finding media recordings that match one of the unique identifiers in the content repository for more than one digital service provider, the system performs the following steps for each media recording in each of the digital service providers' content repositories: retrieving non-standardized public representations of metadata for the media recording that matches one of the unique identifiers; identifying and transforming metadata values from the non-standardized public representations of retrieved metadata into standardized formats using a format removal algorithm(s) and/or a mapping table(s) corresponding to the digital service provider from which the metadata was retrieved. The system then determines if the identified metadata values for each digital service provider in their standardized formats match each other. Responsive to a determination that the identified metadata values for each digital service provider in their standardized formats do not match each other, the system generates a notification of inconsistent metadata and electronically transmits the notification to an end user.

In some embodiments, each unique identifier includes a universal product code, an international standard recording code, or a direct hyperlink. In some embodiments, the distinctive metadata includes a universal product code, an international standard recording code, or a direct hyperlink.

Some embodiments include a method for reconstructing a content owner's digital media catalog from non-standardized public representations available through a digitally accessible media source. The method includes acquiring a plurality of unique identifiers, wherein each unique identifier corresponds to media content in the content owner's digital media catalog; digitally accessing, over a computer network, a content repository of the digitally accessible media source, wherein the content repository includes metadata corresponding to media recordings; and searching the accessed content repository for media recordings that match one of the unique identifiers in the plurality of unique identifiers. In response to finding a media recording that matches one of the unique identifiers in the content repository, the following steps are performed: retrieving from the content repository a non-standardized representation of metadata for the media recording that matches one of the unique identifiers; identifying metadata values from the non-standardized representations of retrieved metadata; and digitally transforming the identified metadata values from their non-standardized representations into proprietary representations of a distributor.

Some embodiments further include receiving a plurality of media files corresponding to the media content; identifying a digital media fingerprint for each media file, wherein each media fingerprint includes distinctive metadata values for a corresponding media file; and determining if the distinctive metadata values for any of the corresponding media files match one of the identified metadata values in their proprietary representations. In response to determining a match between any of the corresponding media files and one of the identified metadata values in their proprietary representations, the corresponding media file is linked to the metadata values in their proprietary representations. Each of the plurality of media files can be matched and linked to identified metadata values in their proprietary representations to digitally reconstruct the content owner's digital media catalog in a standardized format.

In response to a failure to match one of the unique identifiers to any media recordings in the content repository, some embodiments generate a notification of the failure and electronically transmit the notification to an end user.

Some embodiments further include digitally accessing, over a computer network, a content repository for a plurality of digitally accessible media sources. In response to finding media recordings that match one of the unique identifiers in the content repository for more than one digitally accessible media source, some embodiments perform the following steps for each media recording in each of the digitally accessible media sources' content repositories: retrieving non-standardized public representations of metadata for the media recording that matches one of the unique identifiers; identifying metadata values from the non-standardized public representations of retrieved metadata; digitally transforming the identified metadata values from their respective non-standardized public representations into proprietary representations of the distributor; determining if the identified metadata values for each digitally accessible media source in their proprietary representations match each other; and responsive to a determination that the identified metadata values for each digitally accessible media source in their proprietary representations do not match each other, generating a notification of inconsistent metadata and electronically transmitting the notification to an end user.

In some embodiments, the unique identifier includes a universal product code, an international standard recording code, or a direct hyperlink. In some embodiments, the distinctive metadata includes a universal product code, an international standard recording code, or a direct hyperlink.

Some embodiments further include transforming the content owner's reconstructed digital media catalog from the standardized format to a preferred format of a certain digitally accessible media source; and digitally transmitting, to the certain digitally accessible media source, the content owner's digital media catalog in the preferred format of the certain digitally accessible media source.

Some embodiments include a system for reconstructing a content owner's digital media catalog from non-standardized public representations available through a digital service provider. The system executes the steps of: acquiring one or more unique identifiers based on a digital media fingerprint for a media file in the content owner's digital media catalog; digitally accessing, over a computer network, a content repository of the digital service provider, wherein the content repository includes metadata corresponding to media recordings; and searching the accessed content repository for media recordings that match one of the unique identifiers. In response to finding a media recording that matches one of the unique identifiers in the content repository, the system retrieves from the content repository a non-standardized public representation of metadata for the media recording that matches one of the unique identifiers; identifies metadata values from the non-standardized public representations of retrieved metadata; and digitally transforms the identified metadata values from their non-standardized public representations into preferred representations of a distributor. The system then links the media file to the metadata values in their preferred representations.

In some embodiments, the system further performs a step of, responsive to a failure to match one of the unique identifiers to any media recordings in the content repository, generating a notification of the failure and electronically transmitting the notification to an end user.

In some embodiments, the system digitally accesses, over a computer network, a content repository for a plurality of digital service providers. In response to finding media recordings that match one of the unique identifiers in the content repository for more than one digital service provider, the system performs the following steps for each media recording in each of the digital service providers' content repositories: retrieving non-standardized public representations of metadata for the media recording that matches one of the unique identifiers; identifying metadata values from the non-standardized public representations of retrieved metadata; and digitally transforming the identified metadata values from their respective non-standardized public representations into preferred representations of the distributor. The system then determines if the identified metadata values for each digital service provider in their preferred representations match each other. Responsive to a determination that the identified metadata values for each digital service provider in their preferred representations do not match each other, the system generates a notification of inconsistent metadata and electronically transmitting the notification to an end user.

In some embodiments, the one or more unique identifiers includes a universal product code, an international standard recording code, or a direct hyperlink.

In some embodiments, the system also transforms the metadata values from their standardized format to a preferred format of a particular digital service provider and digitally transmits, to the particular digital service provider, the media file and the linked metadata in the preferred format of the particular digital service provider.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which:

FIG. 6 is an exemplary embodiment of a mapping table.

DETAILED DESCRIPTION OF THE INVENTION

Figure 1:
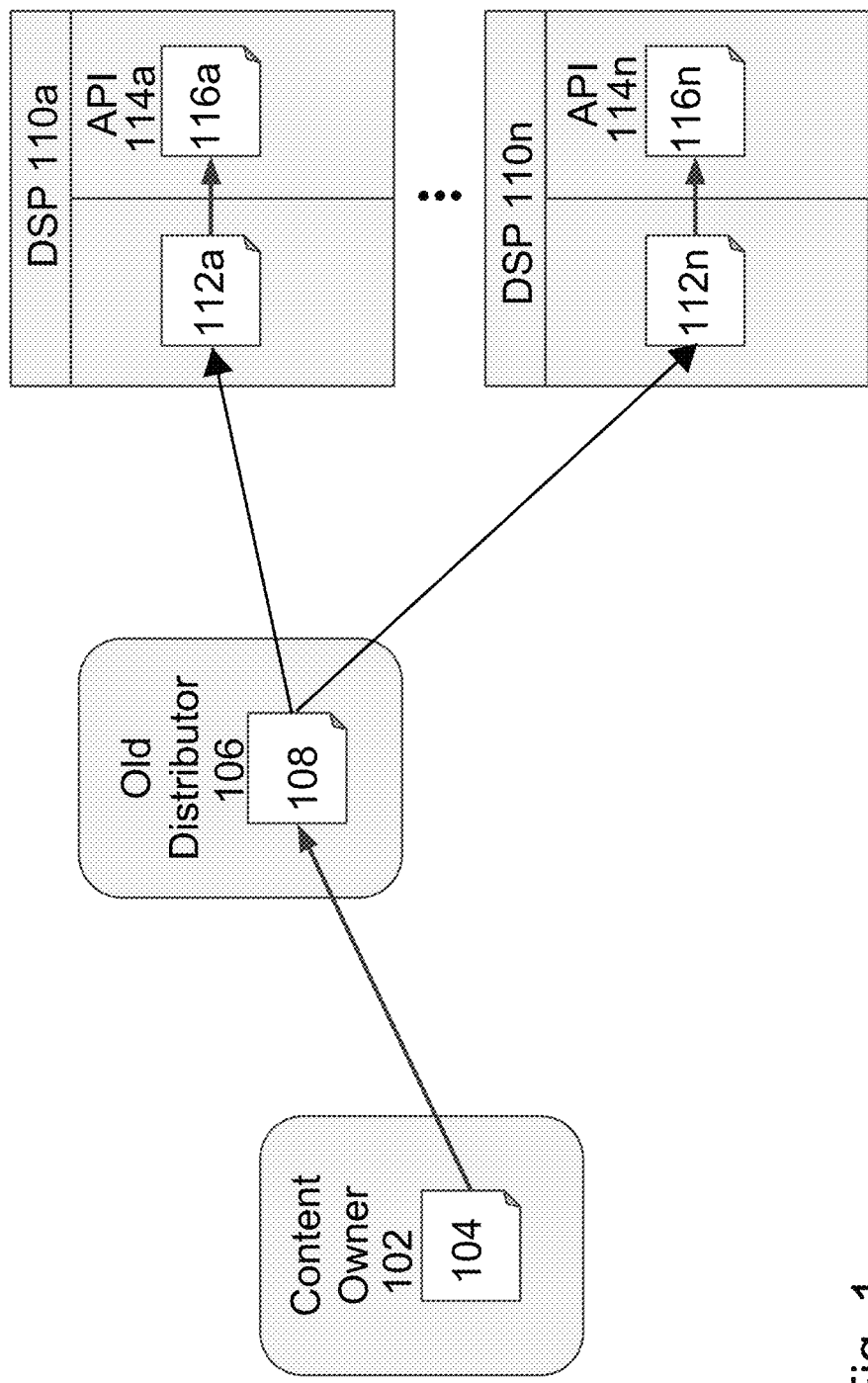
FIG. 1 is a block diagram illustrating the exchange of media content from the content owner to various digital service providers.

In the following detailed description of the preferred embodiments, reference is made to the accompanying drawings, which form a part thereof, and within which are shown by way of illustration specific embodiments by which the invention may be practiced. It is to be understood that other embodiments may be utilized, and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

In the following description, for the purposes of explanation, numerous specific details are set forth in order to provide a thorough understanding of embodiments of the present technology. It will be apparent, however, to one skilled in the art that embodiments of the present technology may be practiced without some of these specific details. The techniques introduced here can be embodied as special-purpose hardware (e.g. computers and circuitry), as programmable computers appropriately programmed with software and/or firmware, or as a combination of special-purpose and programmable computers. Hence, embodiments may include a machine-readable medium having stored instructions thereon which may be used to program a computer (or other electronic devices) to perform a process. The machine-readable medium may include, but is not limited to, floppy diskettes, optical disks, compacts disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some embodiments," "according to some embodiments," "in the embodiments shown," "in other embodiments," and the like generally mean the particular feature, structure, or characteristic following the phrase is included in at least one implementation. In addition, such phrases do not necessarily refer to the same embodiments or different embodiments.

The term "media content" as used herein refers to the combination of metadata and media files for the media. The term "media" refers to audio, video, photographs, combinations thereof, and collections thereof. For example, the terms "audio" or audio "recordings" may refer to an individual audio track (e.g., an audio song) or an album, i.e., a combination of audio tracks. The term "audio content" refers to the combination of metadata and audio files.

The term "media files" refers to computer readable files that when executed by a computer produce a visual and/or audible output. The term "audio files" refers to computer readable files that when executed by a computer produce an audible output. Some non-limiting examples of audio file types include M4A, FLAC, MP3, MP4, WAV, WMA, and AAC. The terms "audio fingerprinting" or "media fingerprinting" refer to an acoustic fingerprint typically generated from an audio signal that can be used to identify a particular audio file.

The term "metadata" refers to a set of data that describes and gives information about other data. Examples of metadata for audio content include but are not limited to artist, genre, label, song title, and album name.

The terms "digitally accessible media source" or "digitally accessible audio source" refer to sources of audio or media content that provide digitally accessible metadata. A digital service provider (DSP) with a publicly available audio repository is a specific example of a digitally accessible media source. While the detailed description section is focused on DSPs, it should be understood that any descriptions related to one or more DSPs is also applicable to digitally accessible media sources and digitally accessible audio sources.

The term "representation" refers to a particular format in which the media content is organized.

An embodiment of the present invention includes a system and method for automated reconstruction of previously released media content, without requiring detailed information from content owners. Some embodiments include automatic assignment of media files to the corresponding metadata without requiring human intervention. Some embodiments include algorithms applied to multiple publicly available representations of the media content to reconstruct the canonical metadata, and some embodiments use audio fingerprinting to match audio files to the correct metadata.

An embodiment of the present invention is an improvement over existing audio/music file management systems that are significantly prone to reconstruction errors resulting in a significant loss of DSP usage data and thus revenue. As will be explained further below, the present invention eliminates the possibility of errors and missing information associated with the reconstruction of digital music catalogs to allow for a seamless transition of a music catalog from one distributor to another. In addition, the present invention is adapted to transform discrete, non-standardized data from different DSPs into a complete music catalog for a content owner having a standardized format.

An embodiment of the invention provides a method for reconstructing a content owner's music catalog in an automated fashion by utilizing public application programming interfaces (APIs) provided by DSPs and a fingerprinting program to associate the correct audio files with the metadata for each audio track. As music content moves throughout the digital supply chain, it undergoes multiple transformations into proprietary, idiosyncratic (non-standardized) representations. These unique transformations and representations result in reproduction errors and thus errors in assigning DSP usage data to audio content provided from a new distributor.

As depicted in FIG. 1, content owner 102 has original representation 104 of the media content from content owner 102's music catalog. First distributor 106 receives the media content in representation 104 and modifies it as needed into a preferred representation 108. Once representation 108 is created, first distributor 106 can transform representation 108 into independent/unique representations 112a-112n according to the specifications of each of the various DSPs 110a-110n. DSPs 110 can then use their respective platforms to publicly disseminate the audio files contained in representations 112. DSPs 110 provide public access, via public APIs 114a-114n, to their respective content repositories, which house a subset of the metadata for their audio content. Each DSP's subset of metadata is provided in its preferred non-standardized format, which will be referred to herein as public representations 116a-116n. Because of the lack of a standardized format for public representations 116 the present invention standardizes representations 116 through metadata mapping and/or DSP format removal algorithms, which will be described in greater detail below.

Figure 2:
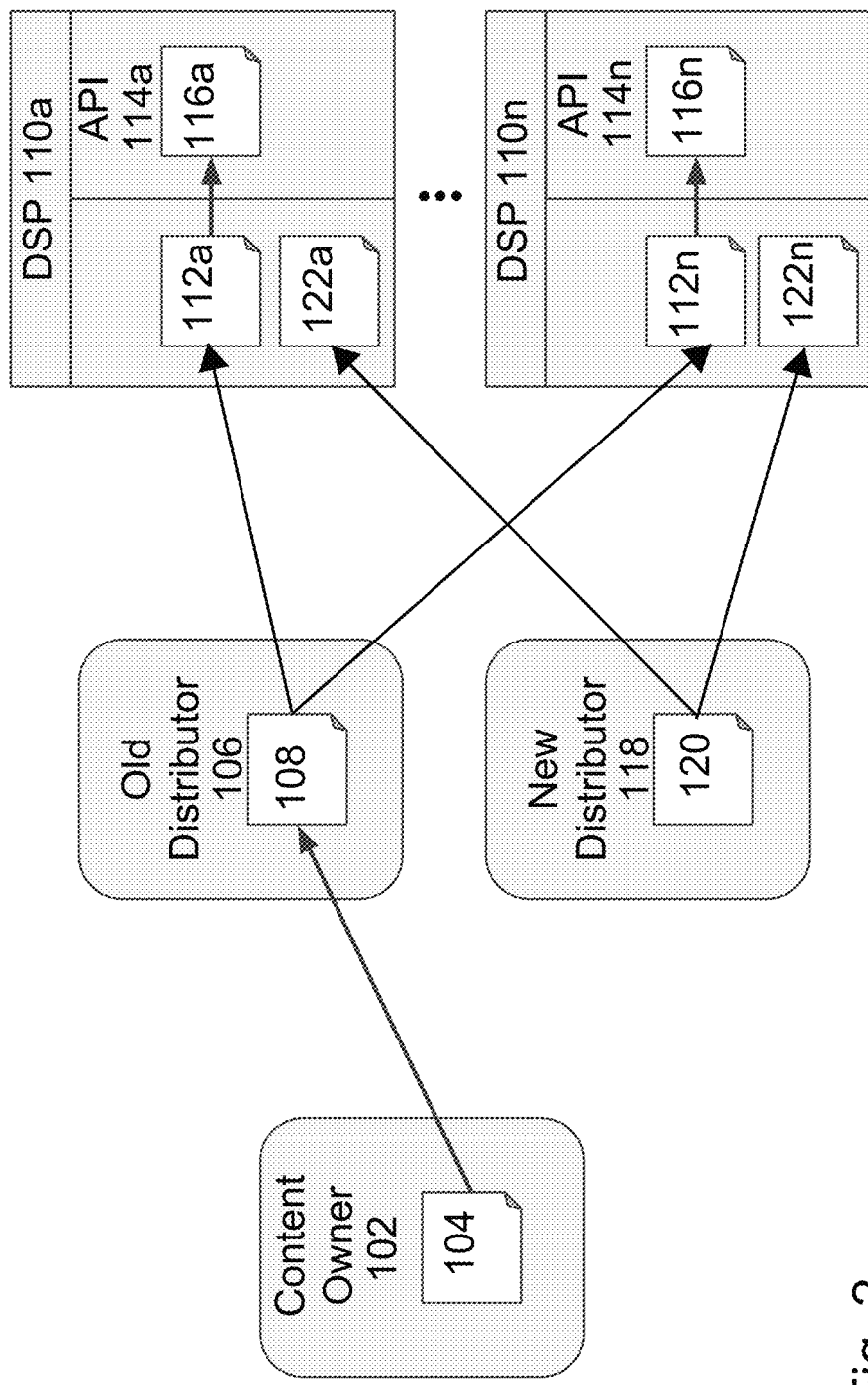
FIG. 2 is a block diagram illustrating the media content distribution results that the new distributor 118 needs to accomplish.

Referring now to FIG. 2, when content owner 102 decides to employ new distributor 118, content owner 102 runs the risk of losing DSP usage data, which establishes the value of the music content. To avoid this potential loss, new distributor 118 attempts to provide DSPs 110 with reproduced representations 122 that match the previous representations 112 as provided by previous distributor 106. However, new distributor 118 will have its own proprietary system and algorithms for transforming audio content into the DSP-preferred representations. To reproduce representations 112, new distributor 118 must acquire all of the metadata and audio files, convert that information into the new distributor 118's proprietary representation 120 (which is invariably distinct from the representations of other distributors), and then apply its proprietary algorithms to convert its internal representation 120 to DSP-preferred representations 122. Any errors or missing information in new distributor 118's representation 120 will have a ripple effect that causes errors or missing information in representations 122. If a certain audio track or album has missing or incorrect metadata or an incorrectly matched audio file, the previously acquired DSPs usage data for that song or album will not transfer to the song or album as provided in representation 122.

In an ideal situation, new distributor 118 has its own complete representation 120 of the origination media catalog representation 104. New distributor 118 could simply transform representation 120 to recreate representations 112a-112n through its proprietary algorithms that transform representation 120 into DSP-preferred representations 122a-122n. In this scenario, representations 122 match representations 112 and the DSPs can migrate all the existing DSP usage data for this content, preserving the earnings potential of the content.

Prior art methods for creating representation 120 require a human to tediously comb through the data and manually recreate the music catalog in the new distributor's system. However, this process is extremely tedious and error prone. Moreover, this recreation almost always fails to match representations 112a-112n because of the lack of a standardized format for the metadata.

Figure 3:
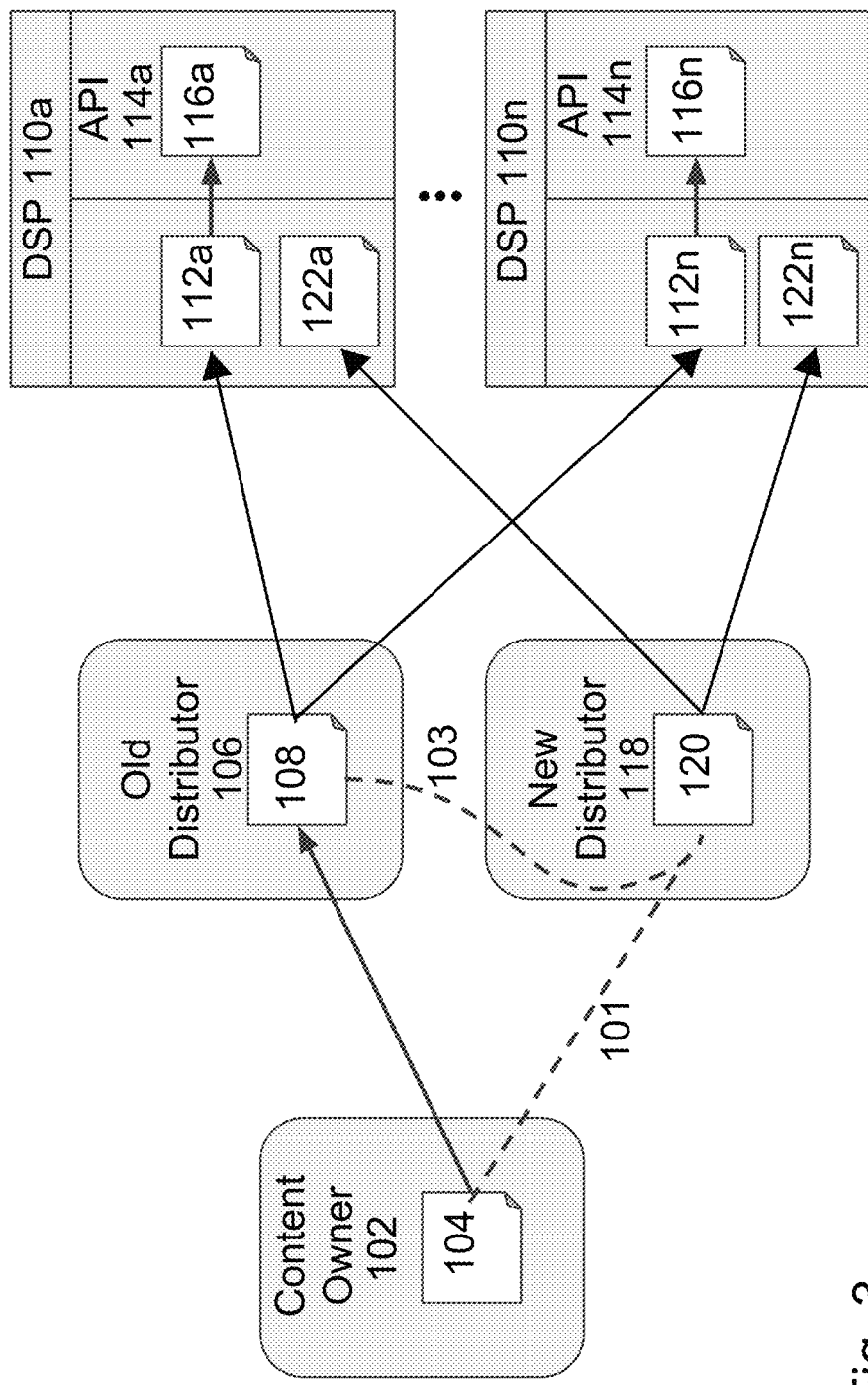
FIG. 3 is a block diagram illustrating the exchange of media content when the content owner decides to employ a new distributor when the old distributor provides information to the new distributor.

In some uncommon cases (such as voluntary sale to the new distributor), old distributor 106 and new distributor 118 will collaborate to transform the old distributor's representation 108 into representation 120 that new distributor 118 requires to use its proprietary algorithms for converting representation 118 into DSP-required representations 122a-122n. These pathways are depicted in FIG. 3. As shown therein, Content owner 102 hires new distributor 118 and provides as much media content as possible represented by arrow 101. However, content owner 102 rarely if ever has the complete catalog of the necessary data. In this cooperative situation, old distributor 106 delivers representation 108 to new distributor 118, which is represented by arrow 103. Again, this is a rare and unlikely scenario.

When old distributor 106 is unwilling to work with new distributor 120 and content owner 102 does not have adequate up-to-date records, it is nearly impossible to completely and accurately recreate DSP representations 112. The result is a loss of DSP usage data for the music content and in turn a loss in revenue.

The present invention, however, provides a technical solution to this technical problem as detailed in the metadata reconstruction and media fingerprinting sections below. An embodiment of the present invention employs one or more computer devices/platforms or computer implemented software to perform actions associated with those described herein. The term "reconstruction system" will be used to refer to one or more computer systems operating the software that executes the steps described herein.

Metadata Reconstruction

Figure 4:
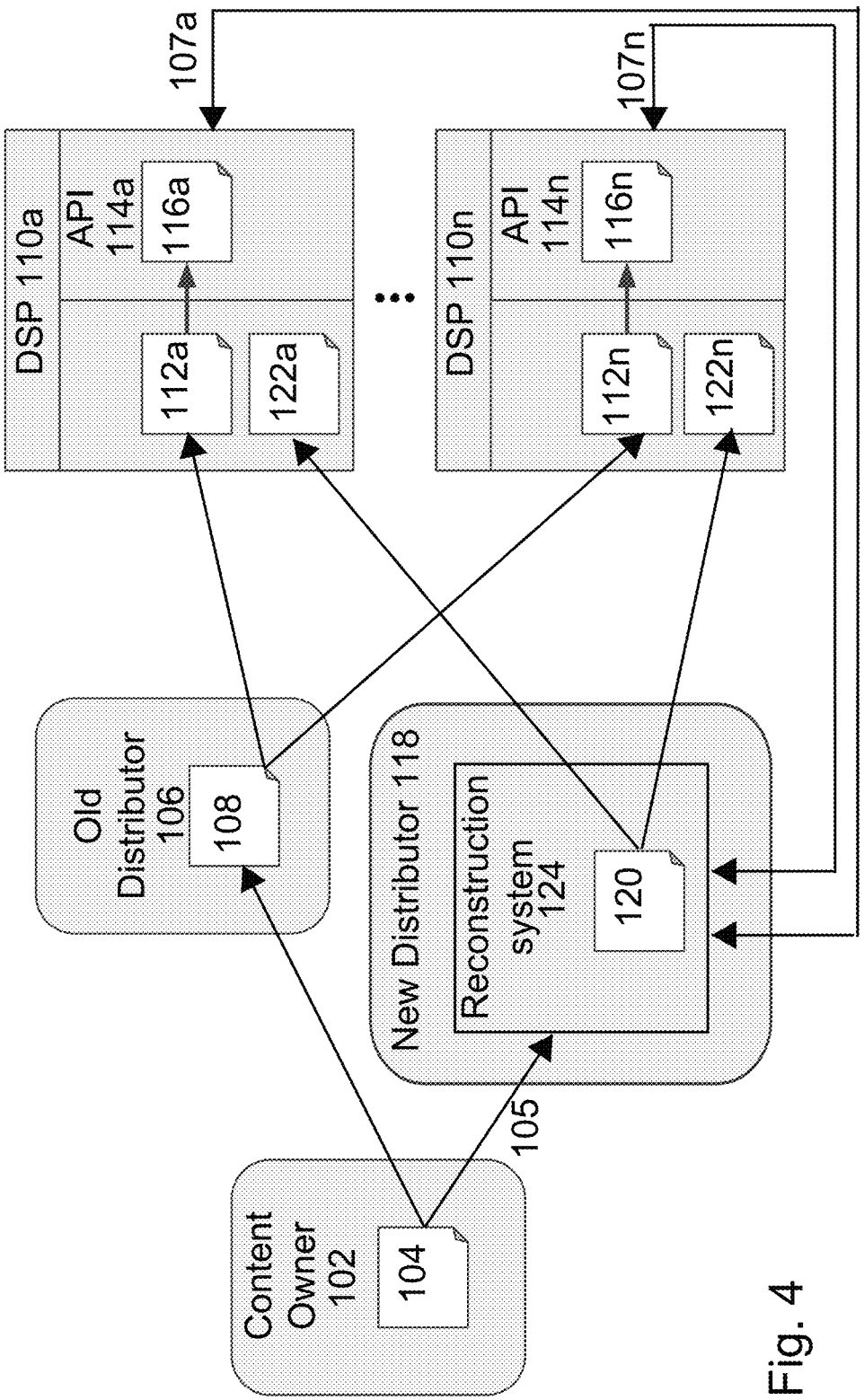
FIG. 4 is a block diagram representing an embodiment of the present invention.
Figure 5:
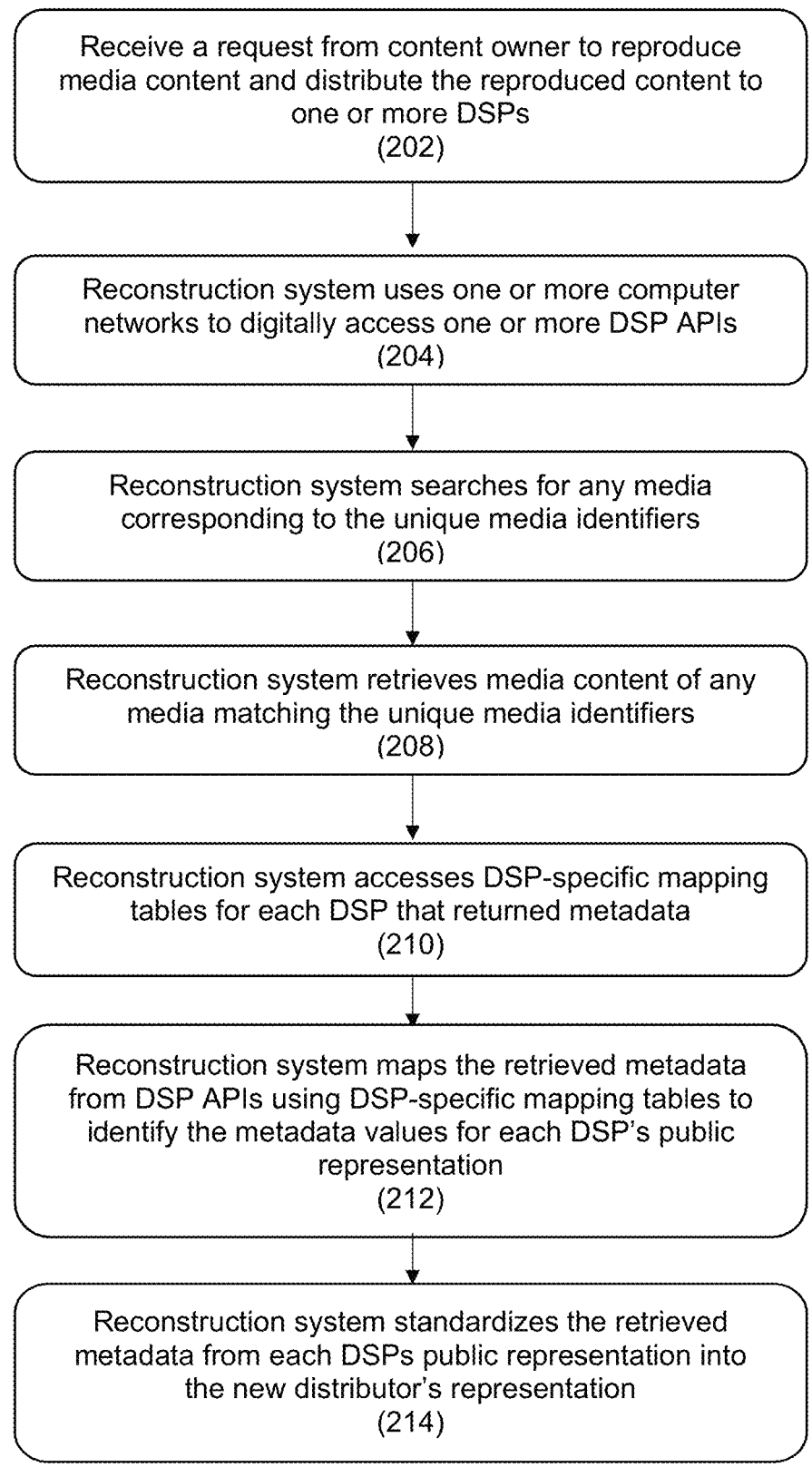
FIG. 5 is a flowchart of an embodiment of the present invention.

Referring now to the block diagram of FIG. 4 and the flowchart of FIG. 5, new distributor 118 receives a request from content owner 102 to reproduce media content and distribute the reproduced content to one or more DSPs 110 (step 202). In some embodiments, the request is digitally sent over a computer network (e.g., the Internet) as represented by arrow 105 in FIG. 4. In such instances, reconstruction system 124 digitally receives the content owner's request.

The content owner's request includes unique identifiers for identifying individual media of which the owner's media content is comprised. The unique identifier may include but is not limited to a universal product code (UPC), which can identify an album or single; an international standard recording code (ISRC), which can identify an individual audio track; a direct hyperlink (such as a hyperlink to a Spotify album or YouTube video), which can identify an album or song; or other unique identifiers capable of identifying individual media. Some embodiments seek to reduce the burden on the content owner by requiring a minimum amount of information to identify the media through a unique identifier.

Upon receipt of the unique identifiers, reconstruction system 124 uses one or more computer networks to digitally access one or more DSP APIs 114 (step 204). APIs 114 act as digital gateways to retrieve metadata from the DSP content repositories. The content repositories include at least some of the metadata in the form of public representations 116 for the various audio tracks and albums disseminated by the DSPs.

Once reconstruction system 124 has access to DSP APIs 114, reconstruction system 124 searches the content repositories for any media corresponding to the unique media identifiers (step 206). Any matching media is detected and the media content that is publicly provided through representations 116 for each matching media is exported to reconstruction system 124 (step 208). Arrows 107a-107n in FIG. 4 represent reconstruction system 124's access of APIs 114 and retrieval of the media content corresponding to any particular media that matches the unique media identifiers.

However, on an individual basis, no currently available DSP API 114 offers all the information necessary to meet even the media content delivery specifications for that DSP itself, let alone other DSPs. Thus, an embodiment of the present invention accesses multiple DSPs 110 via APIs 114 and aggregates the media content from the multiple public representation 116a-116n for each DSP 110a-110n to reconstruct the metadata portion of representation 120, as shown in FIG. 4. In some embodiments, reconstruction system 124 accesses each API 114 of a designated set of DSPs 110 and searches for the same media content in each public representation 116 for each DSP 110 in the designated set of DSPs.

Often the retrieved metadata from public APIs 114 contains many fields of information, such as title, artist, genre, etc. Some fields are only available from one DSP's API 114 and not another. In contrast, some embodiments return the same fields pertaining to a single audio track or album from several different DSPs 110. As a result, each instance of the returned media content for the same audio track or album can possibly have different metadata representations. In addition, some fields return different values from different APIs 114a-114n than is required for representation 120. Thus, some embodiments, include metadata transformation steps to convert the metadata values from one or more metadata fields into a standardized format. The transformation of the metadata into a standardized format may include DSP specific mapping tables and/or DSP format removing algorithms. Steps 210 and 212 of FIG. 5 related to the use of mapping tables, however, an embodiment could use DSP format removing algorithms in steps 210 and 212 as an alternative or as an additional option for standardizing the retrieved metadata.

Referring to FIGS. 5-6, an embodiment includes the steps of accessing DSP-specific mapping tables 126 (e.g. the genre mapping table in FIG. 6) for one or more metadata fields for each DSP in which metadata is returned via APIs 114 (step 210).

Reconstruction system 124 then maps the retrieved metadata values from DSP APIs 114 using the DSP-specific mapping tables, and transforms the DSP-returned metadata values for the various data fields into new distributor 118's standardized format to create representation 120 (step 212). The DSP-specific mapping tables can be stored locally on the reconstruction system or may be stored remotely from the reconstruction system.

FIG. 6 provides an exemplary mapping table 126 which corresponds to genre naming conventions of DSP 110a. DSP 110a's genre naming convention is located in the first column 115 and the corresponding genre conversions 117 are located in the second column. When DSP 110a returns genre metadata values 115, those values are mapped to the corresponding genre conversions 117 of new distributor 118 using genre mapping table 126. Some embodiments use mapping tables for additional metadata fields or all metadata fields for the one or more DSPs 110 that return metadata values.

DSPs 110 may also change their internal formatting for public representations 116, which could produce unexpected API responses for certain fields over time. As a result, reconstruction system 124 may receive a metadata value that does not match the mapping tables designed for that particular DSP 110. Thus, some embodiments include a step of identifying unexpected values not already in the mapping tables. In these cases, no value is imported. Instead an alert is generated, and the user is notified of the unexpected value and/or notified that the corresponding DSP mapping tables needs to be updated.

Figure 7A:
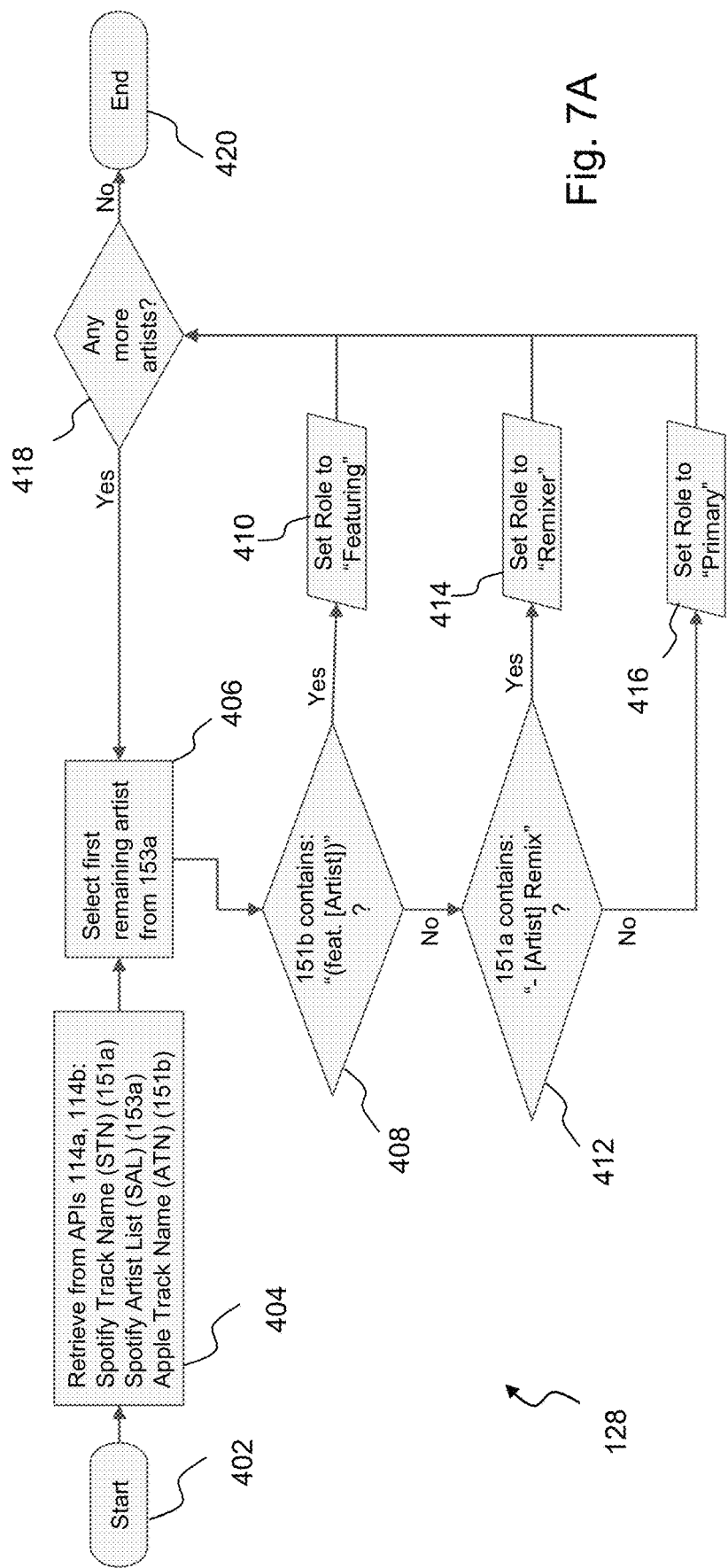
FIG. 7A is a flowchart of an exemplary embodiment of a DSP format removing algorithm for converting non-standardized metadata for track names and track artists to a standardized format.

In some embodiments, the system automatically standardizes the metadata values using DSP format removing algorithms 128 exemplified in FIG. 7 in addition to or as an alternative to using mapping tables. Format removing algorithms may be necessary when conflicting metadata values or unnecessary values from different DSPs are returned due to the DSP-required transformations that occur. For example, consider the metadata retrieved for track name/ titles and artist names. When iTunes is the DSP, the representation of the track name/title will include a featuring artist's name in parenthesis next to track title. In contrast, when Spotify is the DSP, the public representation of the track title does not include the artists' names with the track title. Thus, when retrieving the track title metadata from both Apple/iTunes and Spotify, the track metadata will not match because of the lack of an industry standardized format. For this reason, some embodiments of the present invention include DSP format removing algorithms 128 to transform the metadata from the non-standardized retrieved public representations 116a-116n to a standardized format that coincides with new distributor 118's proprietary representation 120.

FIG. 7 provide an example of a DSP format removing algorithm 128 configured to standardize retrieved track name metadata 151 and artist metadata 153 from the public representations 116a and 116b of two DSPs 110a (Spotify in this example) and 110b (Apple in this example). Using algorithm 128, the present invention converts the non-standardized returned metadata values 151 and 153 into new distributor 118's standardized metadata formats for track title 161 and artist name(s) 163, which are used for representation 120.

The exemplary DSP format removing algorithm 128 is initiated at step 402. The metadata values 151 and 153 are retrieved from the two DSPs 110a and 110b in step 404. Following algorithm 128, the system identifies the first remaining artist name in the list of returned metadata 153a in step 406. Using known character recognition/matching methods, the algorithm determines if the returned track name metadata 151b for DSP 110b matches the featuring artist name listed in track name metadata 151b, which is identified by "(feat. [Artist])." If the artist name matches the featuring artist in track name metadata 151b, the artist is set as the featuring artist in representation 120 at step 408. If the artist name does not match the featuring artist in track name metadata 151b or metadata 151b does not include a featuring artist, the system moves to step 412.

In step 412, track name metadata 151a from DSP 110a is analyzed to determine if a remix artist is listed in track name metadata 151a. Remix artists are identified in track name metadata 151a by "-[Artist] Remix." If the artist name matches the featuring artist in track name metadata 151a, the artist is set as the "Remixer" artist in representation 120 at step 414. If the artist name does not match the remixer artist in track name metadata 151a or metadata 151a does not include a remixer artist, the system sets the artist name as the "Primary" artist in representation 120 at step 416.

Following each instance of the artist name being identified as the primary artist, remixer artist, or featuring artist, the system moves on to step 418 to determine if there are any more listed artists in artist list metadata 153a from DSP 110a. If there are additional remaining artists, the system reverts back to step 406. If there are no more artist, the algorithm ends at step 420.

Figure 7B:
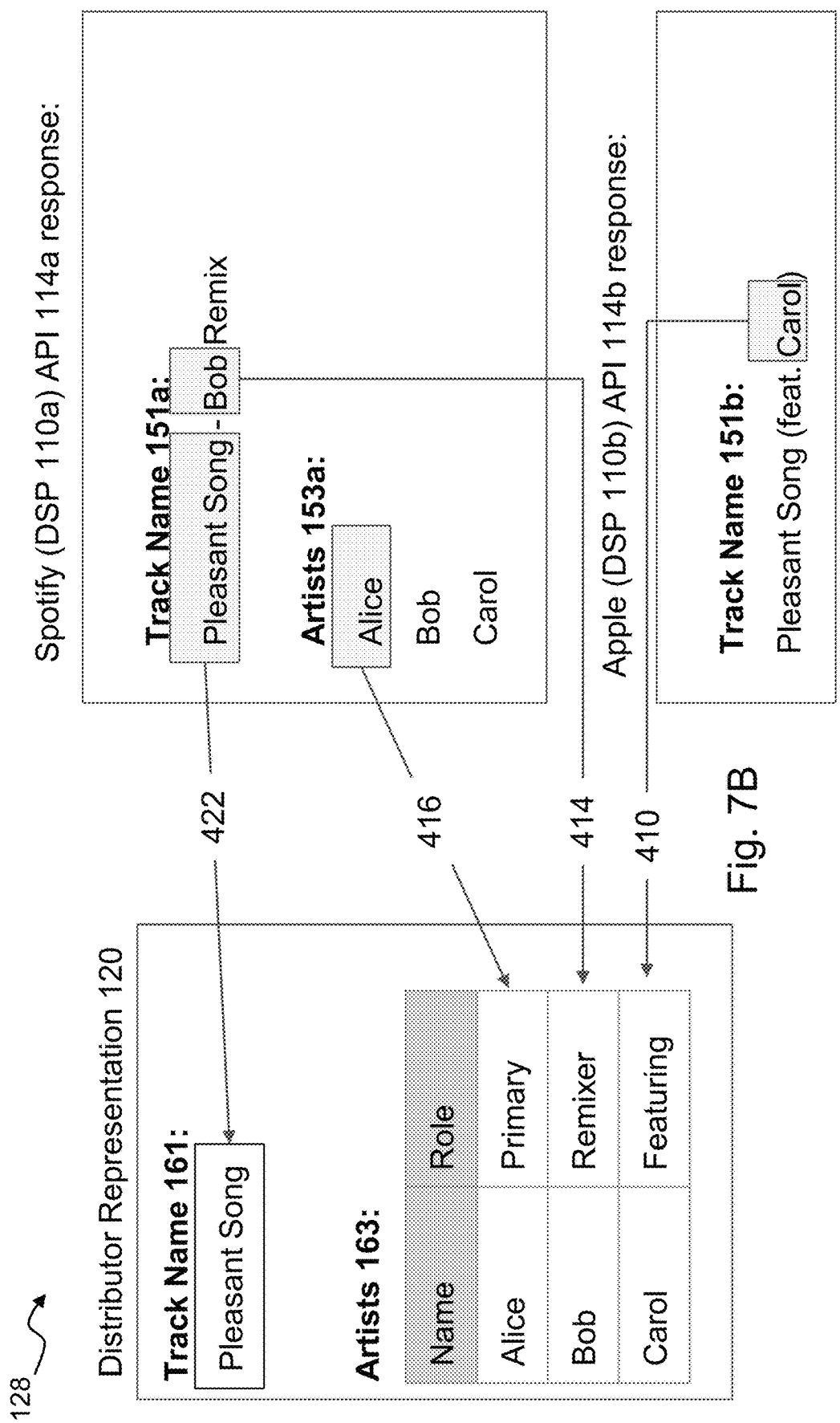
FIG. 7B is a block diagram representation of FIG. 7A.
Figure 8:
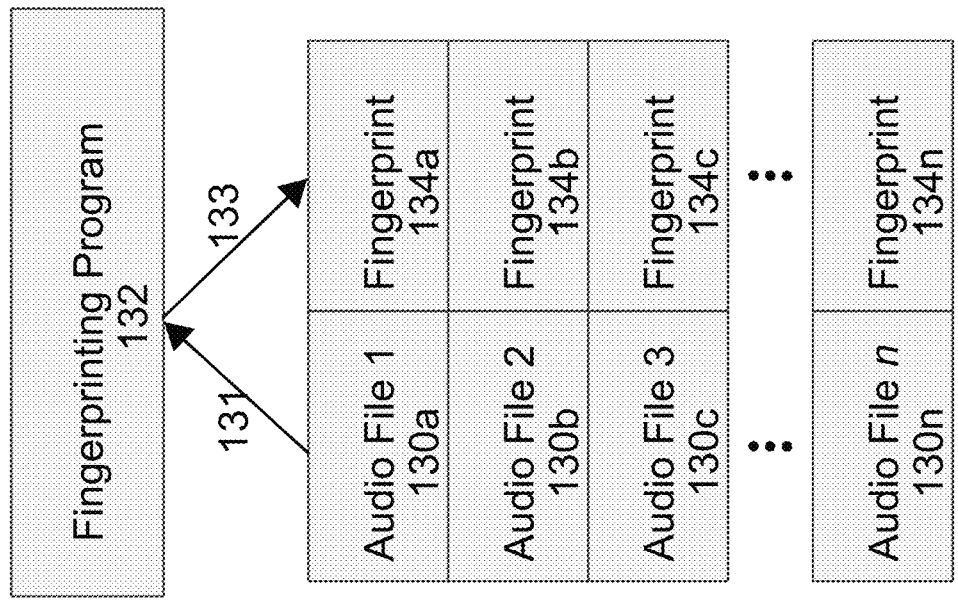
FIG. 8 is a block diagram representing an embodiment of the audio fingerprinting program.
Figure 9:
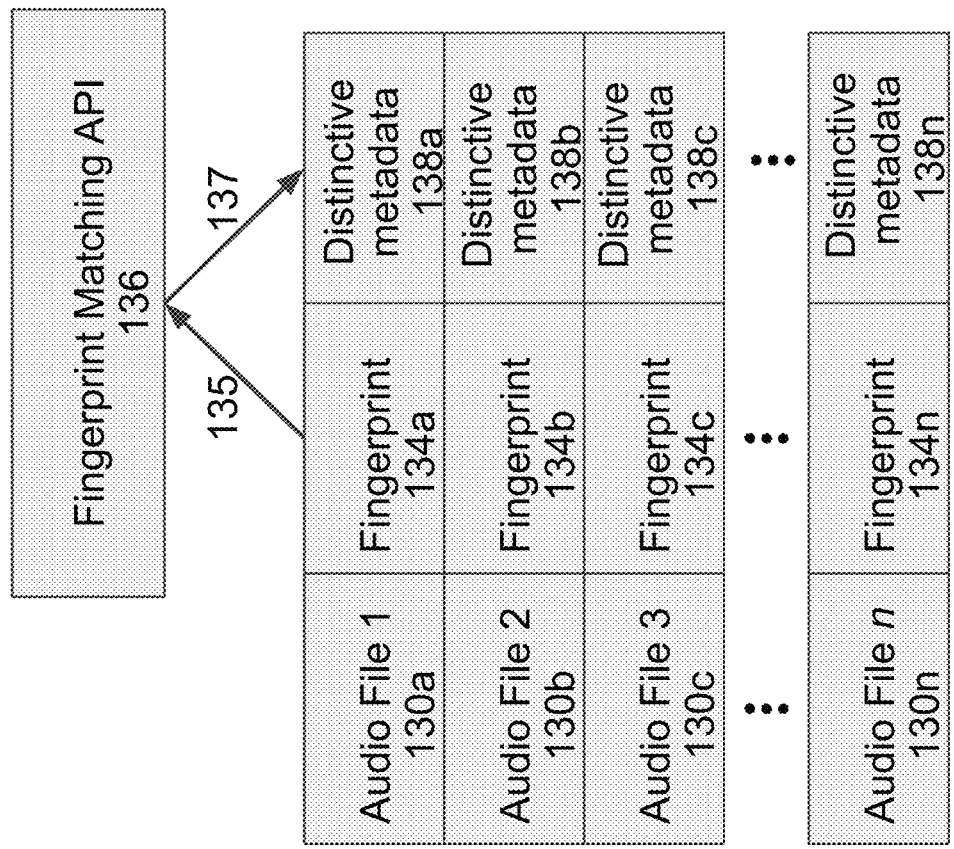
FIG. 9 is a block diagram representing an embodiment of the fingerprint matching algorithm.

Referring to FIG. 7B, the track name metadata 151a and 151b are identified and transformed into standardized format 161 for representation 120. This transformation can be achieved by truncating track name metadata 151a to values prior to the "-" value and/or by truncating track name metadata 151b to values prior to the "(" value. The transformed metadata value is provided to new distributor 118 as illustrated by reference arrow 422.

In some embodiments, the system has a DSP format removing algorithm 128 for each metadata field for each DSP that returns metadata. Each DSP format removing algorithm 128 is configured to remove unnecessary information and standardize the returned metadata values based on the known public representations of the respective DSP. Thus, the returned metadata values for one or more metadata fields can be converted into a standardized format to automatically reconstruct the media content in the form of representation 120. While the exemplary FIG. 7 provide an example in which two DSPs are considered, DSP format removing algorithms may be used for a single DSP. In addition, the exemplary format removing algorithm assessed multiple metadata fields, however, a single DSP format removing algorithm may be used for each metadata field for each DSP.

The system then compares (using for e.g., field and character recognition software) any media content with the same ISRC (assuming that the system initially retrieved media content pertaining to a single audio track or album from several different DSPs 110) to determine if there are any inconsistencies amongst the metadata following the transformation from the DSP format removing algorithms. Any inconsistencies are flagged and presented to a user for manual correction.

In some embodiments, content owner 102 provides a UPC as the unique media identifier, which can identify an album composed of several audio tracks, rather than an individual audio track. In this instance, the reconstruction system retrieves the media content for the entire album. When multiple tracks are retrieved via a single UPC, each track with its corresponding metadata is recorded in a separately identifiable manner, such as through the use of canonical data and/or ordinal positioning (i.e., track numbers) of the media content for a particular album or UPC.

In some embodiments, metadata cannot be obtained from enough DSPs to automatically create representation 120 because some of the metadata values may remain unknown. In these cases, a notification is generated and displayed to the content owner and/or new distributor 118 to convey which portion of the metadata is missing and requires manual input.

Some embodiments may organize the access and searching of DSPs 110 in a manner in which the system only looks for media content not yet found from any previously searched DSPs 110. This practice reduces search time and the possibility of competing representations as identified in the preceding paragraph. However, certain embodiments search each of DSP 110 as a way to double check the retrieved metadata.

Some embodiments include an automatic or manual confirmation request. Upon receiving one or more unique identifiers from the content owner, an embodiment will conduct a search for the specific media content that coincides with the unique identifiers. When the media content is identified, the system requests a digital confirmation from the content owner before proceeding with step 204. If a positive confirmation is received, the system continues to step 204. If a negative confirmation is received, the system notifies the user that there is an issue identifying one or more of the specific media of which the content owner's catalog is comprised.

Media Fingerprinting

Once as much metadata as possible (preferably a complete set of metadata) is assembled for representation 120, audio files 130 must be matched to the corresponding metadata. The prevailing industry practice for this process is that the content owner must either rename each of their files and place them into a directory structure as specified by the new distributor or match them one at a time to each track. Both of these processes are error prone and can lead to mismatches, failure to link DSP usage data on the audio content, and therefore loss of revenue.

The invention includes a system and method to automate the process of correctly linking audio files 130 to the appropriate metadata, regardless of the file and folder naming convention used by the content owner. Initially content owner 102 provides a collection of digital audio files corresponding to its media catalog. In some embodiments, audio files 130 are sent to new distributor 118 via a computer network (e.g., the Internet) as represented by arrow 105 in FIG. 4. In such instances, the reconstruction system digitally receives the audio files.

Figure 10:
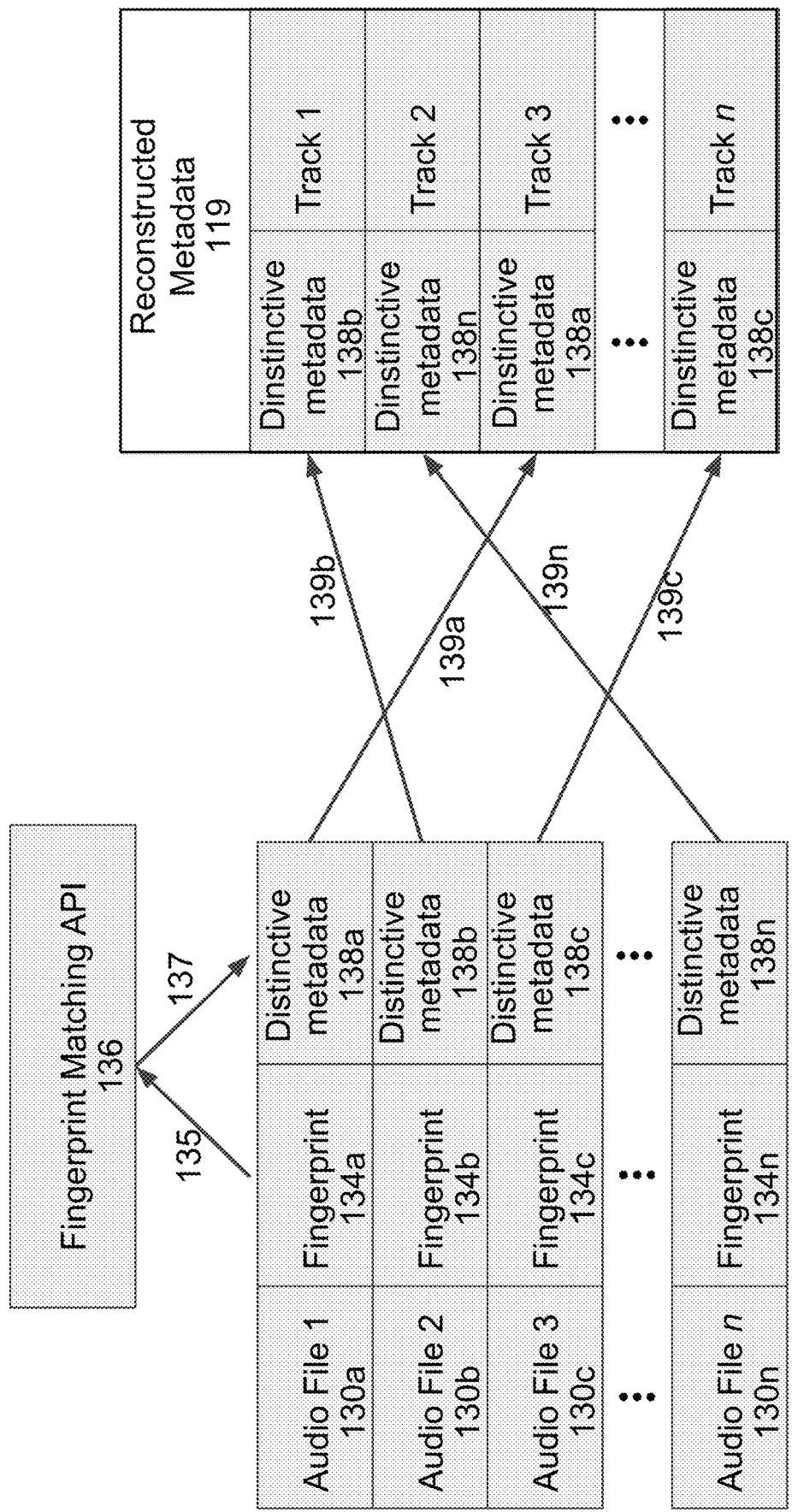
FIG. 10 is a block diagram representing an embodiment of the matching steps of the present invention.
Figure 11:
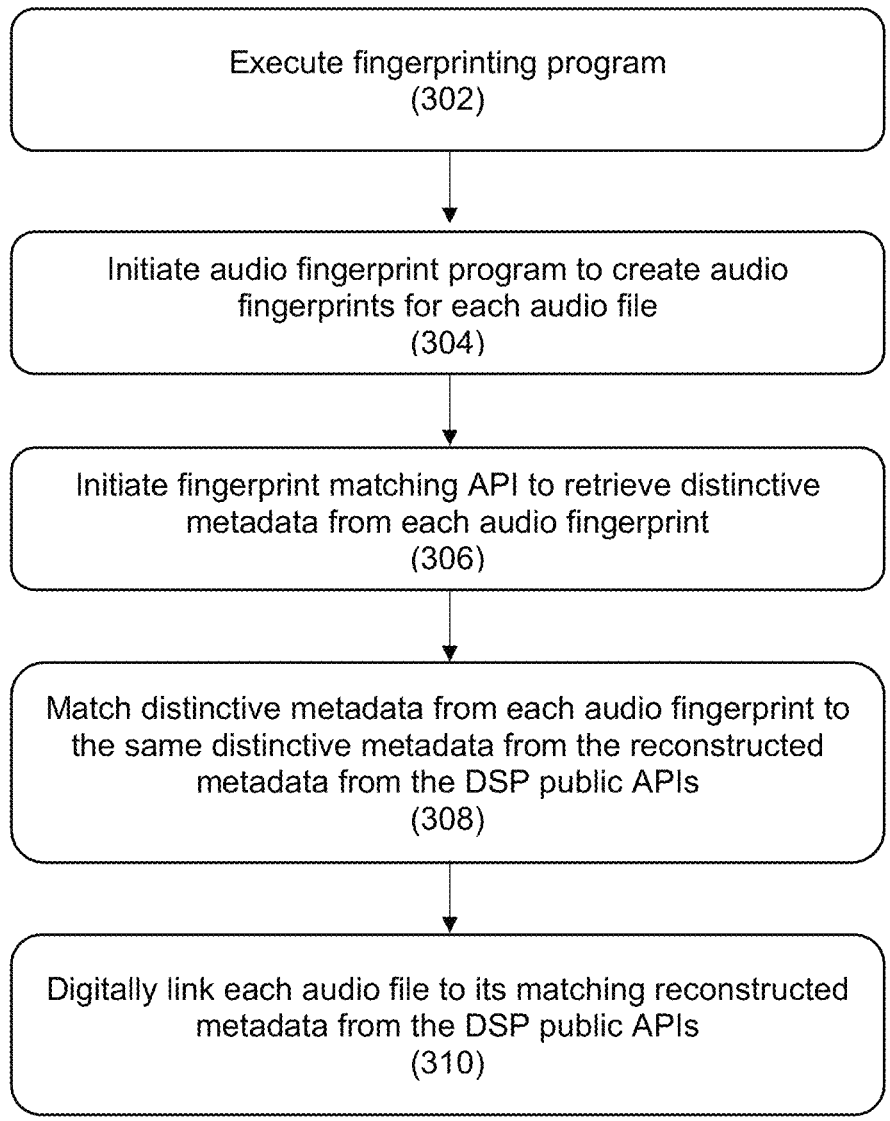
FIG. 11 is a flowchart of an embodiment of the fingerprint matching program.

Referring now to FIGS. 8-11, the present invention executes audio fingerprinting program 132 (step 302 in FIG. 11). Audio files 130 are digitally provided to audio fingerprinting program 132 as demonstrated by arrow 131. Audio fingerprinting program 132 identifies each audio file 130 and outputs audio fingerprints 134 as demonstrated by arrow 133 (step 304). Audio fingerprinting program 132 can be locally accessible by reconstruction system 124 or can be accessible via a computer network.

Once unique audio fingerprints 134 are created for each audio file 130, fingerprint matching API 136 is called. Fingerprint matching API 136 can be locally accessible by reconstruction system 124 or can be accessible via a computer network.

Audio fingerprints 134 are digitally provided to fingerprint matching API 136 as demonstrated by arrow 135. Fingerprint matching API 136 identifies audio fingerprints 134 and returns metadata (often a limited subset of metadata) for each audio file 130 as demonstrated by arrow 137 (step 306). The limited metadata includes certain distinctive metadata 138 shown in FIG. 9. Distinctive metadata 138 may include but is not limited to a UPC, an ISRC, or other distinctive metadata capable of distinguishing one audio file from another.

The present invention then employs a matching algorithm to match distinctive metadata 138 from audio fingerprints 134 to the same distinctive metadata found in reconstructed metadata 119 (step 308). The present invention digitally links each audio file to its matching reconstructed metadata (step 310). FIG. 10 provides an exemplary block diagram with arrows 139 illustrating how the matching algorithm correctly links audio files 130 to the reconstructed metadata 119.

At this point in the process, the metadata has been reconstructed (with any missing values supplied by the content owner if necessary) and the audio files have been linked correctly, completing representation 120. An embodiment of the present invention then transforms representation 120 of the media content (audio files and linked reconstructed metadata) to one or more of the DSP-preferred formats 122*a*-112*n* and the respective transformations 122*a*-122*n* are provided to the corresponding DSPs 110*a*-110*n*. Because a complete re-creation was achieved, representations 122 will match previous representations 112 already on the DSPs through the old distributor, thereby ensuring that the DSPs attach DSP usage data to representations 122.

Some embodiments of the present invention operate in a reverse order in relation to the metadata reconstruction and fingerprint matching steps.

In an embodiment, the system starts with one or more unidentified audio files. The system executes the fingerprint program to identify distinctive metadata for each audio file. The distinctive metadata is then used to search one or more DSP APIs 114. Any media on the DSP platforms that matches the distinctive metadata is identified and all of the metadata for the matching media is retrieved. In some embodiments, this occurs for each DSP or each of a subset of existing DSPs. In an embodiment, the system then uses DSP mapping algorithms and/or DSP format removing algorithms to transform the metadata retrieved from public representations 116 into a new standardized representation 120.

An embodiment includes a system and method for detecting when the DSP has recognized that the new representations 122 of the media content, delivered by new distributor 118, matches representations 112 supplied by old distributor 106, and therefore the same DSP usage data applies. To do this, the present invention initially delivers representation 122 with availability only in certain countries. Following this, the invention attempts to access, via the API, the new instance of the media content in a territory where it is not available and determines if DSPs 110 fall back to the old distributor's representation 112 of the content. When DSPs 110 fall back as described, this indicates that the two instances have been linked in the DSP's databases/systems. The remaining territories can then be enabled by new distributor 118 to complete the full distribution of the content.

Consider an example in which new distributor 118 makes representations 122*a* available worldwide, except for in Canada. The system can use API 114*a* to request information about a particular track from representation 122*a*. That information will be unavailable with respect to Canada and DSP 110*a* will initially report that the track is unavailable. However, a second attempt to access the same track will result in DSP 110*a* suggesting an alternative representation of the same track, which stems from old distributor 106. This response confirms that the new representation 122*a* has been linked to old representation 112*a* and thus the DSP usage data will follow new representation 122*a*. At this point, new distributor 118 can enable the track in Canada for representation 122*a* and then old distributor 106 is instructed to take down its copies.

An embodiment of the present invention further includes a method of automatically monitoring DSPs 110, using their respective APIs 116, to determine if the previous distributor's instance of the content has been removed. When the invention accesses the DSP public APIs 116 (shown in FIG. 4) references to the old distributor's instances of the music content are stored. These same references can be monitored on a recurring basis to determine whether the older instances remain available or have been properly removed. This feature helps solve a longstanding challenge in digital music distribution industry, specifically that revenue to the new distributor, and also sometimes revenue to the client, is never received by the new distributor and/or client, because the old distributor continues to be paid by DSPs for certain content which the old distributor has never taken down or which the DSPs have left linked in their systems to the old distributor in error even after receiving takedown requests from the old distributor. In these cases, the new distributor and the client may assume revenue is now flowing to the new distributor for this content as a result of their initial attempts to recreate the catalog at the new distributor. To confirm that the proper entity is receiving the revenue, the present invention continually monitors the old instances to determine whether the older instances remain available or have been properly removed. Once the system determines that the old instances have been removed, an embodiment of the present invention ceases the reoccurring monitoring and notifies the new distributor and/or content owner.

Hardware and Software Infrastructure Examples

The present invention may be embodied on various computing platforms that perform actions responsive to software-based instructions. The following provides an antecedent basis for the information technology that may be utilized to enable the invention.

The system and method described herein may be comprised of a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C#, C++, Visual Basic or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It should be noted that when referenced, an "end-user" is an operator of the software as opposed to a developer or author who modifies the underlying source code of the software. For security purposes, authentication means identifying the particular user while authorization defines what procedures and functions that user is permitted to execute.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A method for reconstructing a content owner's digital media catalog from non-standardized public representations available through a digitally accessible media source, comprising:
  acquiring a plurality of unique identifiers, wherein each unique identifier corresponds to media content in the content owner's digital media catalog;
  digitally accessing, over a computer network, a content repository of the digitally accessible media source, wherein the content repository includes metadata corresponding to media recordings;
  searching the accessed content repository for media recordings that match one of the unique identifiers in the plurality of unique identifiers;
  responsive to finding a media recording that matches one of the unique identifiers in the content repository:
    retrieving from the content repository a non-standardized representation of metadata for the media recording that matches one of the unique identifiers;
    identifying metadata values from the non-standardized representations of retrieved metadata; and
    digitally transforming the identified metadata values from their non-standardized representations into proprietary representations of a distributor.

2. The method of claim 1, further including:
  receiving a plurality of media files corresponding to the media content;
  identifying a digital media fingerprint for each media file, wherein each media fingerprint includes distinctive metadata values for a corresponding media file;
  determining if the distinctive metadata values for any of the corresponding media files match one of the identified metadata values in their proprietary representations;
  responsive to determining a match between any of the corresponding media files and one of the identified metadata values in their proprietary representations, linking the corresponding media file to the metadata values in their proprietary representations;
  whereby each of the plurality of media files can be matched and linked to identified metadata values in their proprietary representations to digitally reconstruct the content owner's digital media catalog in a standardized format.

3. The method of claim 1, further including, responsive to a failure to match one of the unique identifiers to any media recordings in the content repository, generating a notification of the failure and electronically transmitting the notification to an end user.

4. The method of claim 1, further including:
  digitally accessing, over a computer network, a content repository for a plurality of digitally accessible media sources;
  responsive to finding media recordings that match one of the unique identifiers in the content repository for more than one digitally accessible media source, performing the following steps for each media recording in each of the digitally accessible media sources' content repositories:
    retrieving non-standardized public representations of metadata for the media recording that matches one of the unique identifiers;
    identifying metadata values from the non-standardized public representations of retrieved metadata;
    digitally transforming the identified metadata values from their respective non-standardized public representations into proprietary representations of the distributor;
  determining if the identified metadata values for each digitally accessible media source in their proprietary representations match each other;
  responsive to a determination that the identified metadata values for each digitally accessible media source in their proprietary representations do not match each other, generating a notification of inconsistent metadata and electronically transmitting the notification to an end user.

5. The method of claim 1, wherein each unique identifier includes a universal product code, an international standard recording code, or a direct hyperlink.

6. The method of claim 1, wherein the distinctive metadata includes a universal product code, an international standard recording code, or a direct hyperlink.

7. The method of claim 1, further including:
  transforming the content owner's reconstructed digital media catalog from the standardized format to a preferred format of a certain digitally accessible media source; and
  digitally transmitting, to the certain digitally accessible media source, the content owner's digital media catalog in the preferred format of the certain digitally accessible media source.

8. A method for reconstructing a content owner's digital audio catalog from non-standardized representations available through one or more digital service providers, comprising:

receiving a plurality of unique identifiers, wherein each unique identifier corresponds to audio content in the content owner's digital audio catalog;

digitally accessing, over a computer network, one or more digital service providers' content repositories via application programming interfaces, wherein each application programming interface provides access to a particular digital service provider's content repository that includes metadata corresponding to the particular digital service provider's audio recordings;

for each of the unique identifiers, searching the one or more digital service providers' content repositories for audio recordings that match the unique identifiers;

responsive to finding an audio recording that matches one of the unique identifiers in the one or more digital service providers' content repositories:

retrieving a non-standardized representation of metadata for the audio recording that matches one of the unique identifiers;

identifying metadata values from the non-standardized representations of retrieved metadata; and digitally transforming the identified metadata values from their respective non-standardized representations into proprietary representations of a distributor.

9. The method of claim 8, further including:

receiving a plurality of audio files corresponding to the audio content;

identifying a digital audio fingerprint for each audio file, wherein each audio fingerprint includes distinctive metadata values for a corresponding audio file;

determining if the distinctive metadata values for any of the corresponding audio files match one of the identified metadata values in their proprietary representations;

responsive to determining a match between any of the corresponding audio files and one of the identified metadata values in their proprietary representations, linking the corresponding audio file to the metadata values in their proprietary representations;

whereby each of the plurality of audio files can be matched and linked to the identified metadata values in their proprietary representations to digitally reproduce the content owner's digital audio catalog in a standardized format.

10. The method of claim 8, further including, responsive to a failure to find the audio recording that matches one of the unique identifiers in one of the digital service providers' content repositories, generating a notification of the failure and electronically transmitting the notification to an end user.

11. The method of claim 8, further including:

transforming the content owner's digital audio catalog from the standardized format to a preferred format of a digital service provider; and digitally transmitting, to the digital service provider, the content owner's digital audio catalog in the preferred format of the digital service provider.

12. The method of claim 8, further including:

responsive to finding audio recordings that match one of the unique identifiers in more than one of the digital service providers' content repositories, performing the following steps for each audio recording in each of the digital service providers' content repositories:

retrieving non-standardized representations of metadata for the audio recording that matches one of the unique identifiers;

identifying metadata values from the non-standardized representations of retrieved metadata;

digitally transforming the identified metadata values from their respective non-standardized representations into proprietary representations of the distributor;

determining if the identified metadata values for each digital service provider in their proprietary representations match each other; and responsive to a determination that the identified metadata values for each digital service provider in their proprietary representations do not match each other, generating a notification of inconsistent metadata and electronically transmitting the notification to an end user.

13. The method of claim 8, further including mapping tables corresponding to each digital service provider that is digitally accessed over the computer network, wherein the mapping tables are used to digitally transform the retrieved metadata values from their respective non-standardized format into their proprietary representations.

14. The method of claim 8, wherein each unique identifier includes a universal product code, an international standard recording code, or a direct hyperlink.

15. The method of claim 8, wherein the distinctive metadata includes a universal product code, an international standard recording code, or a direct hyperlink.

16. A system for reconstructing a content owner's digital media catalog from non-standardized public representations available through a digital service provider, the system executing the steps of:

acquiring one or more unique identifiers based on a digital media fingerprint for a media file in the content owner's digital media catalog;

digitally accessing, over a computer network, a content repository of the digital service provider, wherein the content repository includes metadata corresponding to media recordings;

searching the accessed content repository for media recordings that match one of the unique identifiers;

responsive to finding a media recording that matches one of the unique identifiers in the content repository:

retrieving from the content repository a non-standardized public representation of metadata for the media recording that matches one of the unique identifiers;

identifying metadata values from the non-standardized public representations of retrieved metadata;

digitally transforming the identified metadata values from their non-standardized public representations into preferred representations of a distributor; and linking the media file to the metadata values in their preferred representations.

17. The system of claim 16, further including a step of, responsive to a failure to match one of the unique identifiers to any media recordings in the content repository, generating a notification of the failure and electronically transmitting the notification to an end user.

18. The system of claim 16, further executing the steps of:

digitally accessing, over a computer network, a content repository for a plurality of digital service providers;

responsive to finding media recordings that match one of the unique identifiers in the content repository for more than one digital service provider, performing the following steps for each media recording in each of the digital service providers' content repositories:

retrieving non-standardized public representations of metadata for the media recording that matches one of the unique identifiers;

identifying metadata values from the non-standardized public representations of retrieved metadata;

digitally transforming the identified metadata values from their respective non-standardized public representations into preferred representations of the distributor;

determining if the identified metadata values for each digital service provider in their preferred representations match each other;

responsive to a determination that the identified metadata values for each digital service provider in their preferred representations do not match each other, generating a notification of inconsistent metadata and electronically transmitting the notification to an end user.

19. The system of claim 16, wherein the one or more unique identifiers includes a universal product code, an international standard recording code, or a direct hyperlink.

20. The system of claim 16, further including the steps of:

transforming the metadata values from their standardized format to a preferred format of a particular digital service provider; and digitally transmitting, to the particular digital service provider, the media file and the linked metadata in the preferred format of the particular digital service provider.

* * * * *